(12) United States Patent
Doll et al.

(10) Patent No.: US 12,365,223 B2
(45) Date of Patent: Jul. 22, 2025

(54) AIR VENT

(71) Applicant: Faurecia Innenraum Systeme GmbH, Hagenbach (DE)

(72) Inventors: Volker Doll, Ranschbach (DE); Stephane Londiche, Montmagny (FR); Julien Seiller, Munich (DE); Martin Schulz, Karlsruhe (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 18/510,266

(22) Filed: Nov. 15, 2023

(65) Prior Publication Data

US 2024/0083222 A1   Mar. 14, 2024

Related U.S. Application Data

(63) Continuation of application No. 17/486,463, filed on Sep. 27, 2021, now Pat. No. 11,878,573, which is a (Continued)

(30) Foreign Application Priority Data

May 29, 2013   (DE) .......................... 102013210053.1

(51) Int. Cl.
| | |
|---|---|
| *B60H 1/34* | (2006.01) |
| *F24F 7/04* | (2006.01) |
| *F24F 13/072* | (2006.01) |

(52) U.S. Cl.
CPC ......... *B60H 1/3421* (2013.01); *B60H 1/3414* (2013.01); *B60H 1/345* (2013.01); (Continued)

(58) Field of Classification Search
CPC .. B60H 1/00564; B60H 1/00871; B60H 1/34; B60H 1/3414; B60H 1/345;
(Continued)

(56) References Cited

U.S. PATENT DOCUMENTS

| | | |
|---|---|---|
| 3,101,038 A | 8/1963 | Archer |
| 3,908,528 A | 9/1975 | Bertin et al. |
| | (Continued) | |

FOREIGN PATENT DOCUMENTS

| | | |
|---|---|---|
| DE | 102006032587 A1 | 1/2008 |
| DE | 102007019602 B3 | 6/2008 |
| | (Continued) | |

OTHER PUBLICATIONS

Office Action and English translation for corresponding DE Application No. 102013210053.1, dated Dec. 9, 2013, 5 pages.

*Primary Examiner* — Avinash A Savani
*Assistant Examiner* — Dana K Tighe
(74) *Attorney, Agent, or Firm* — Reising Ethington P.C.

(57) ABSTRACT

An air vent is configured to discharge two separate volumetric flows of air in respectively different and intersecting discharge directions. A perceived air discharge direction is adjustable with no change to the intersecting discharge directions. A first volumetric flow of air exits the first air duct in a first direction, and a second volumetric flow of air exits the second air duct in a second direction that intersects the first direction so that the volumetric flows of air collide after exiting airducts of the air vent. A non-visible vane located along one of the air ducts is moveable to change the perceived air discharge direction.

19 Claims, 3 Drawing Sheets

Related U.S. Application Data continuation of application No. 16/228,145, filed on Dec. 20, 2018, now Pat. No. 11,400,795, which is a continuation of application No. 14/887,055, filed on Oct. 19, 2015, now Pat. No. 10,195,924, which is a continuation of application No. 14/257,344, filed on Apr. 21, 2014, now Pat. No. 9,163,848.

(52) U.S. Cl.
CPC .............. *F24F 7/04* (2013.01); *F24F 13/072* (2013.01); *B60H 2001/3492* (2013.01)

(58) Field of Classification Search
CPC ........... B60H 2001/00092; B60H 2001/00214; B60H 2001/3478; B60H 2001/3492; B60H 1/3421; F24F 7/04; F24F 13/072; F24F 13/075
USPC ................ 454/143, 152, 153, 154, 155, 284
See application file for complete search history.

(56) References Cited

U.S. PATENT DOCUMENTS

| | | | |
|---|---|---|---|
| 4,345,510 A | 8/1982 | Sterett | |
| 5,356,336 A | 10/1994 | Stouffer et al. | |
| 6,059,652 A | 5/2000 | Terry et al. | |
| 6,715,814 B1 | 4/2004 | Hoyle | |
| 6,902,474 B2 | 6/2005 | Gehring et al. | |
| 7,029,390 B2 | 4/2006 | Karadia | |
| 7,604,533 B2 | 10/2009 | Ogura et al. | |
| 8,109,813 B2 * | 2/2012 | Sakakibara | B60H 1/3414 454/143 |
| 9,163,848 B2 | 10/2015 | Doll et al. | |
| 10,195,924 B2 | 2/2019 | Doll et al. | |
| 2004/0152412 A1 | 8/2004 | Gehring et al. | |
| 2008/0014855 A1 | 1/2008 | Leserre | |
| 2008/0081550 A1 | 4/2008 | Shibata et al. | |
| 2008/0146139 A1 | 6/2008 | Terai et al. | |
| 2010/0011799 A1 | 1/2010 | Sakakibara | |
| 2010/0130115 A1 | 5/2010 | Miki | |
| 2010/0263401 A1 | 10/2010 | Sakakibara et al. | |
| 2019/0118621 A1 | 4/2019 | Doll et al. | |

FOREIGN PATENT DOCUMENTS

| | | |
|---|---|---|
| DE | 102011003433 A1 | 8/2012 |
| DE | 102011003435 A1 | 8/2012 |
| EP | 1331116 A2 | 7/2003 |
| FR | 2872260 A1 | 12/2005 |

\* cited by examiner

AIR VENT

TECHNICAL FIELD

The invention relates to an air vent for vehicles.

BACKGROUND

Various air vents are known from the prior art. DE 10 2006 032587 A1, for example, discloses an air outlet device for vehicles, which comprises—as viewed in a longitudinal or vertical section—an air duct having a first, upper wall region and, facing this, a second, lower wall region, and which is fluidically connected via an air outlet opening to a passenger compartment of the vehicle. Air can be directed into the passenger compartment via the air duct and the air outlet opening. At least one louver-type air guide element is disposed between the two wall regions in the region or the vicinity of the air outlet opening.

SUMMARY

Embodiments of an air vent include a housing, a first air duct, a second air duct, and a vane. The first air duct is configured to convey a first volumetric flow of air through the housing so that the first volumetric flow of air exits the first air duct in a first direction. The second air duct is configured to separately convey a second volumetric flow of air through the housing so that the second volumetric flow of air exits the second air duct in a second direction that intersects the first direction so that the volumetric flows of air collide after exiting the airducts. The vane is located along one of the air ducts and is moveable to vertically change a perceived air discharge direction. Movement of the vane does not change the first or second direction in which each respective volumetric flow of air exits the respective air duct.

In various embodiments, the vane is not visible to a user of the air vent when the air vent is viewed from an air outlet end of the housing.

In various embodiments, the air vent includes at least one additional vane located along each of the first and second air ducts. Each additional vane is moveable to horizontally change the perceived air discharge direction.

In various embodiments, each additional vane is not visible to a user of the air vent when the air vent is viewed from an air outlet end of the housing.

In various embodiments, the first and second air ducts are defined at least in part between an inner wall of the housing and respective first and second air guide surfaces, each air guide surface being in a fixed position with respect to the housing.

In various embodiments, the first and second directions are each defined at least in part by a shape of an inner wall of the housing and a shape of an air guide surface facing said inner wall and having a fixed position with respect to the housing.

In various embodiments, the vane is pivotably attached along one of the air ducts.

In various embodiments, the vane is a first vane located along the first air duct, the air vent further comprising a second vane located along the second air duct, the second vane being moveable to vertically change the perceived air discharge direction.

In various embodiments, the first and second vanes move together to vertically change the perceived air discharge direction.

In various embodiments, movement of the vane changes the first volumetric flow of air or the second volumetric flow of air.

In various embodiments, the air vent includes a manipulator operatively coupled to the vane to move the vane to vertically change the perceived air discharge direction.

In various embodiments, the manipulator is operable to move at least one additional vane along one of the air ducts to horizontally change the perceived air discharge direction.

Embodiments of an air vent are configured to discharge two separate volumetric flows of air in respectively different and intersecting discharge directions. A perceived air discharge direction is adjustable with no change to the intersecting discharge directions.

In various embodiments, the perceived air discharge direction is vertically adjustable with no change to the intersecting discharge directions.

In various embodiments, the air vent includes a vane that is moveable to adjust the perceived air discharge direction with no change to the intersecting discharge directions. The vane is not visible to a user of the air vent when the air vent is viewed from an air outlet end of the air vent.

In various embodiments, the vane is a first vane that is moveable to change one of the two separate volumetric flows of air, and the air vent includes a second vane that is moveable to change the other of the two separate volumetric flows of air to thereby adjust the perceived air discharge direction with no change to the intersecting discharge directions.

In various embodiments, the first and second vanes move together to change the two separate volumetric flows of air and to adjust the perceived air discharge direction with no change to the intersecting discharge directions.

In various embodiments, the first vane is located along a first air duct that conveys one of the volumetric flows of air through the air vent, and the second vane is located along a different second air duct that conveys the other of the volumetric flows of air through the air vent.

In various embodiments, the first air duct is partly defined by a first air guide surface that is parallel to one of the intersecting discharge directions at an air outlet opening of the air vent, and the second air duct is partly defined by a second air guide surface that is parallel to the other of the intersecting discharge directions at the air outlet opening of the air vent.

In various embodiments, the air vent includes a housing through which the air ducts convey the respective volumetric flows of air. Each of the first air duct and the second air duct is partly defined by an inner wall of the housing, and the inner wall is parallel with each of the first and second air guide surfaces.

It is understood that the above-described embodiments can be combined with one another in any manner, provided the combinations do not cancel each other out.

BRIEF DESCRIPTION OF THE DRAWINGS

Preferred embodiments of the invention are explained in the following in greater detail by reference to the drawings. In the drawings.

DETAILED DESCRIPTION

Elements that are similar to one another are labeled with the same reference signs in the following.

Figure 1:
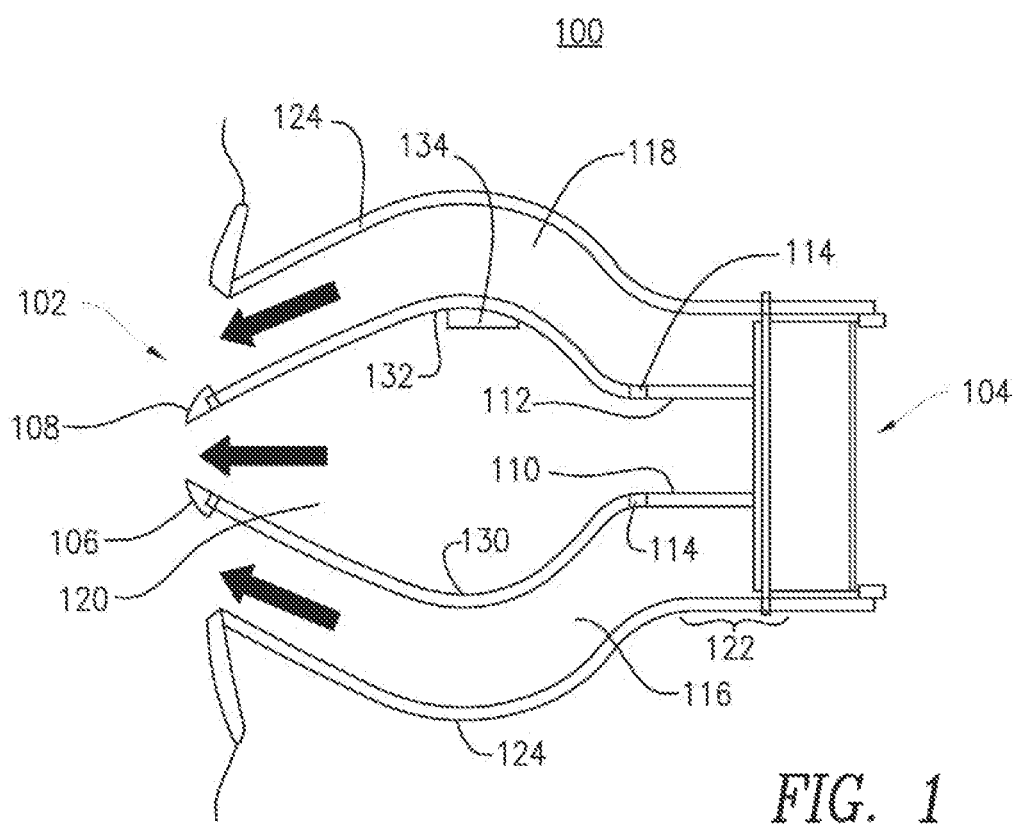
FIG. 1 shows a schematic view of an air vent.

FIG. 1 shows a schematic view of an air vent 100 comprising a housing 124. The air vent has an air inlet opening 104, which is disposed in the axial direction of the housing, and a corresponding air outlet opening 102. The air inlet opening 104 and the air outlet opening 102 are disposed opposite one another as viewed in the axial direction of the housing 124.

Air guide surfaces 106 and 108, which are located in the housing 124, are also clearly shown. Both air guide surfaces 106 and 108 have rounded bulges 130 and 132, respectively, which point in opposite directions, namely vertically upward and downward in FIG. 1. These two directions are opposed to one another and extend perpendicularly to the axial direction of the housing 124. The air guide surfaces 106 and 108 are disposed at a distance from the inner side of the housing 124, thereby forming an air duct 116 between the air guide surface 106 and the interior of the housing 124 and, analogously, an air conduit 118 is formed between the air guide surface 108 and the interior of the housing 124. The inner side of the housing 124 extends parallel to the shape of the air guide surfaces 106 and 108.

A further air duct 120 is formed between the air guide surfaces 106 and 108. If air then flows into the housing 124 from the air inlet opening 104, this air will then flow through the air ducts 116, 118 and 120, as indicated by the directions of the arrows in FIG. 1, and will emerge from the air outlet opening 102. The emerging volumetric flows will mix in a corresponding manner, and therefore the air flow felt at the air outlet opening 102 will be perceived as an air flow that is directed straight ahead.

In order to change the direction of this emerging air flow in the vertical direction, i.e. to deflect this emerging air flow upwardly or downwardly, a vane 110 or 112 is mounted on the air guide surfaces 106 and 108, respectively, via corresponding axes 114. The vanes 110 and 112 can be swiveled in the direction 200 or opposite the direction 200 by means of the axial hinge-connection thereof; see the example depicted in FIG. 2.

Figure 2:
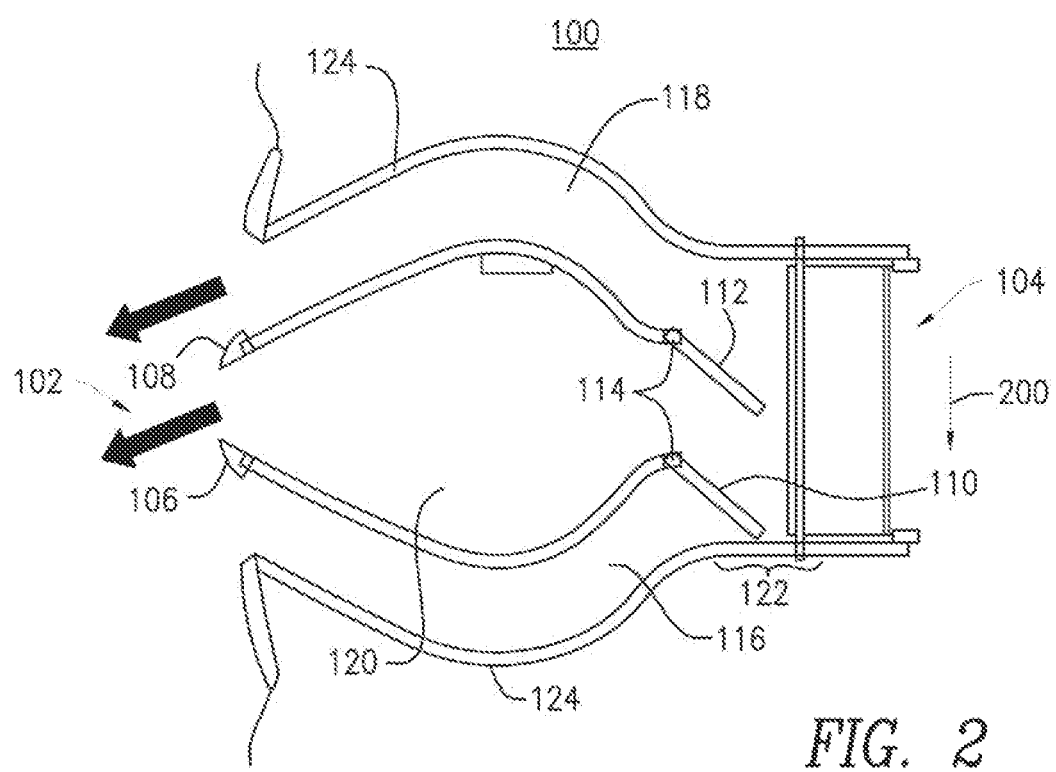
FIG. 2 shows another schematic view of the air vent from FIG. 1.

In FIG. 2, the vanes were swiveled downward about the axis 114 in the direction 200. As a result, the lower air duct 116 was completely closed by the vane 110. The air entering the housing 124 through the air inlet opening 104 can therefore flow only through the air ducts 120 and 118. Due to the bulged shape thereof, and due to the downward slant of the vane 112, the air flow emerging from the air outlet opening is oriented in the downwardly slanted direction.

According to this example, it is therefore possible to control the air flow between various outwardly flowing directions by positioning the vanes 110 and 112 appropriately, without the related air guide components, i.e. the vanes 110 and 112, being visible by an observer from the side of the air outlet opening 102.

This makes it possible, for example, to accommodate an appropriate illumination means 134 within the housing 124, which can provide diffuse illumination of the air vent 100 in darkness. The illumination provided by the illumination means 134 is consistent regardless of the position of the vane 110 or 112, which can make it easier to operate the air vent 100 from the sides of the air outlet opening 102.

The vanes 110 and 112 and the housing 124 have a rectangular shape in the region 122 of the vanes 110 and 112. This makes it possible to easily implement the swivel motion of the vanes without the vanes and the inner walls of the housing 124 interfering with one another.

Figure 3:
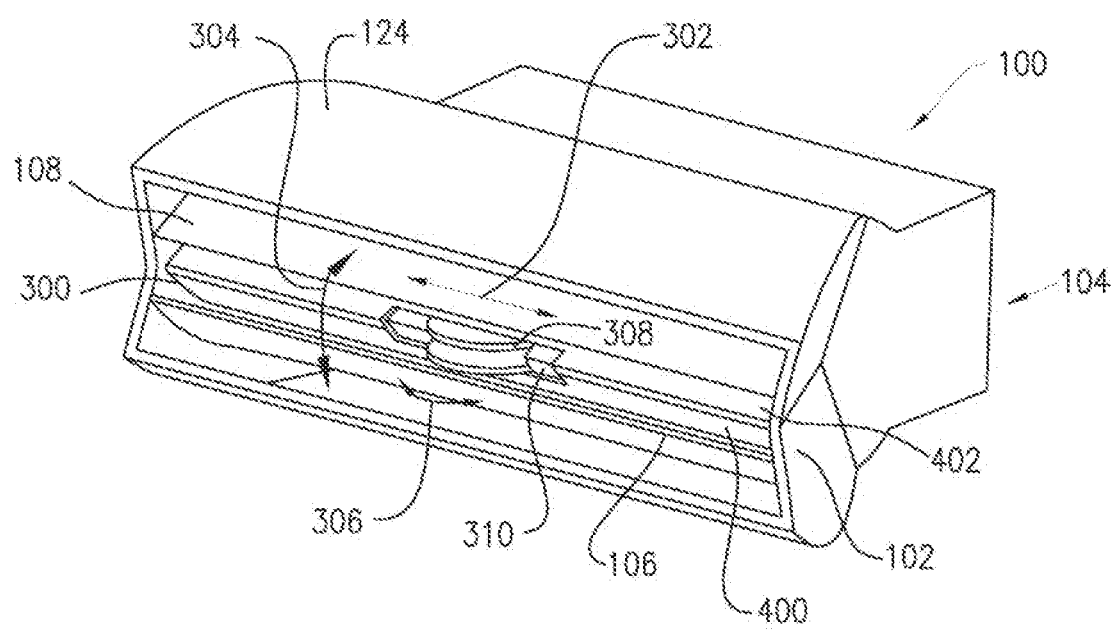
FIG. 3 shows a perspective view of an air vent.
Figure 4:
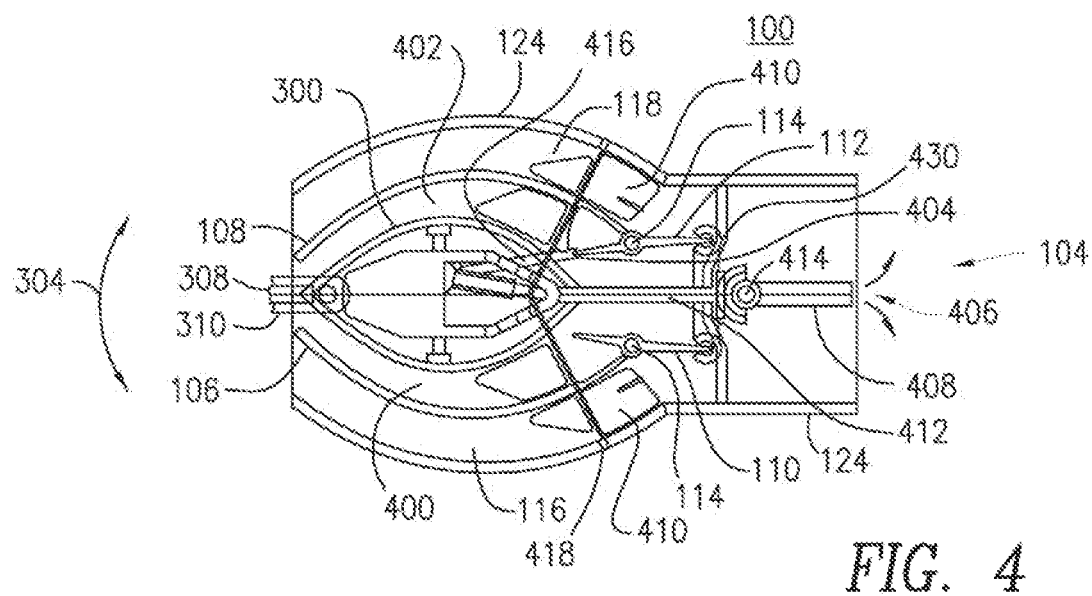
FIG. 4 shows a lateral sectional view of the air vent from FIG. 3.

FIG. 3 shows a further variant of an air vent 100, wherein, as compared to the variant shown in FIGS. 1 and 2, a closed air guide element 300 was selected in this case instead of an air duct between the air guide surfaces 106 and 108. This air guide element, in combination with the air guide surfaces 106 and 108, delimits additional air ducts 400 or 402, as shown in FIG. 4 in particular. Further air ducts 400 and 402 are now provided in addition to the aforementioned air ducts 116 and 118.

FIG. 3 also shows a manipulator 310, which can be swiveled vertically in direction 304 relative to the air guide element 300 rigidly disposed on the housing 124. Furthermore, the manipulator 310 shown in FIG. 3 can be moved in direction 302 horizontally to the left and right relative to the air guide element 300. Finally, the manipulator 310 also comprises a rotatable positioning aid 308, which can be rotated horizontally relative to the manipulator 310 in direction 306.

FIG. 4 shows a lateral sectional view through the air vent 100 depicted in FIG. 3. In addition to the air guide elements 106 and 108, the vanes 110 and 112 known from FIGS. 1 and 2 are shown once more. These, in turn, are disposed on the air guide elements 106 and 108 by means of axes 114, wherein, in the present case, the axes are not disposed at the ends of the vanes 110 or 112, but rather slightly closer to the center relative to the respective vanes, although not necessarily being centered.

One end of the vane 112 is mechanically connected to the manipulator 310, wherein another end of the vane 112, which is diametrically opposed to this end, is mechanically coupled to the vane 110 via the coupling 430. Movement of the manipulator 310 in direction 304 induces a transfer of force between the manipulator 310 and the vane 112, which induces rotation of the vane 112 about the axis 114 thereof due to the coupling between the manipulator 310 and the end of the vane 112. At the same time, the rotation also induces a displacement of the coupling 430 upwardly or downwardly in the vertical direction and, therefore, a corresponding rotation of the vane 110 about the axis 114 thereof. It is thereby possible to adjust a related volumetric flow through the air ducts 116, 400, 402 and 118.

The mechanical coupling between the manipulator 310 and the end of the vane 112 is implemented, for example, via a corresponding coupling rod 416.

FIG. 4 furthermore shows a closing element 408, which is formed of two plates. These plates are supported on the housing 124 via a common axis 414. By means of a rotational motion of the positioning aid 308 in the horizontal direction, a force can be transferred to the plates of the closing element 408 via the coupling rod 412. By means of this force, the plates can be swiveled in the housing 124 opposite to direction 406. By means of this swiveling, the air inlet opening can be completely closed or opened. One of the plates therefore swivels upwardly in the closing procedure, as shown in FIG. 4, while the other plate swivels downwardly, in direction 406, in the closing procedure.

Figure 5:
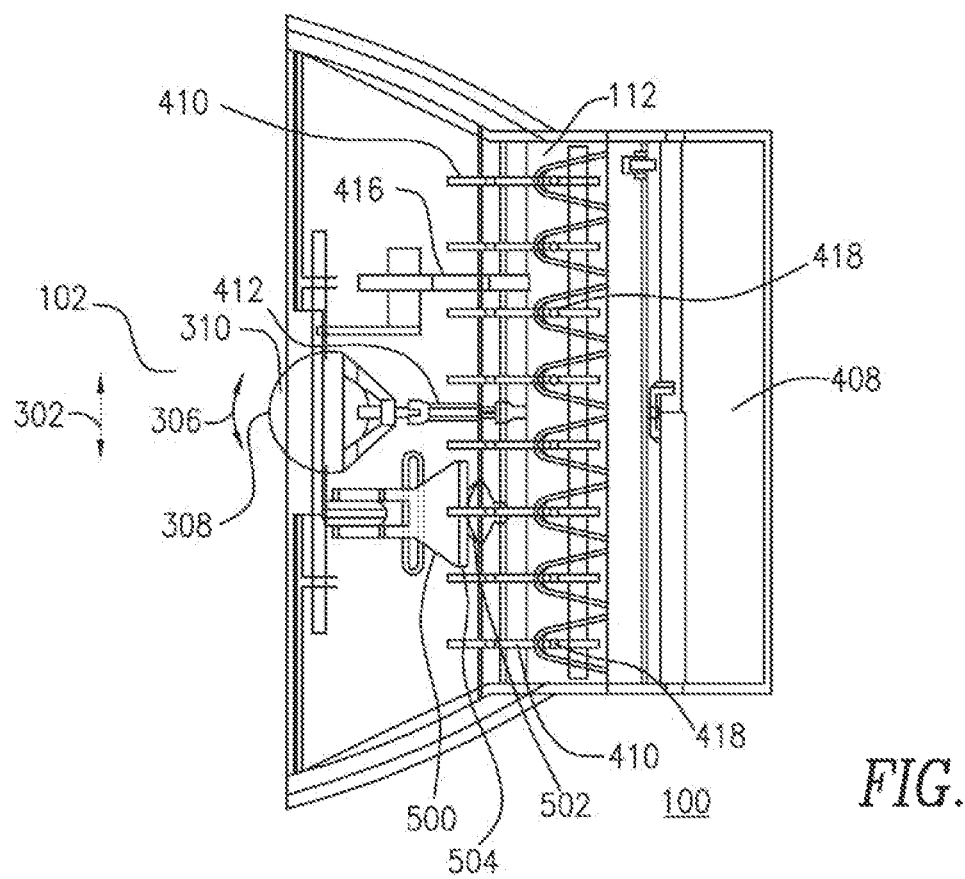
FIG. 5 shows a sectional view of the air vent from FIG. 3, from above.

This procedure and the corresponding mechanical connection are explained in greater detail with reference to FIG. 5. FIG. 5 shows a sectional illustration of the air vent 100 from FIG. 3, from above.

FIG. 5 more clearly shows the positioning aid 308, which can be rotated in direction 306. The rotation occurs relative to the manipulator 310. Rotation of the positioning aid 308 in direction 306 causes the axis between the positioning aid 306 and the closing element 408 in FIG. 5 to move easily in the horizontal plane. The movement of this axis 412 causes a gearwheel disposed between the axis 412 and the closing element 408 to induce a corresponding rotation of the plates of the closing element 408 about the axis 414. Compensation of the length of the coupling rod 412, which may be required therefor, can be implemented by means of components of the coupling rod 412, which can be slid into one another.

FIG. 4 also shows a set of further vanes 410, which are hinge-connected at an axis 418. The view in FIG. 5 clearly shows that these vanes 410, after rotation about the axis 418, can change the directional characteristic of the air flowing out of the air outlet opening 102. While the vanes 110 and 112, according to FIG. 3, are responsible for a directional characteristic in the vertical direction, the vanes 410 define the directional characteristic of the outflowing air in the horizontal direction.

The orientation of the vanes 410 relative to the housing is induced by the manipulator 310 in that this manipulator is displaced in a translatory manner in the horizontal direction 302. A coupling element 500, which is rigidly connected to the manipulator 310, comprises a toothed rack 504, in which a gearwheel 502 engages. In turn, this toothed rack is rigidly connected to the vanes 410. As a result, when the manipulator 310 moves in direction 302, relative motion between the toothed rack 504 and the gearwheel 502 takes place, which, in turn, induces rotation of the vanes 410 about the axes 418 thereof. It is therefore possible to change the directional characteristic of an emerging air flow in the vertical and horizontal directions by means of a single manipulator.

The invention claimed is:

1. An air vent, comprising:
 a housing;
 a first air duct configured to convey a first volumetric flow of air through the housing so that the first volumetric flow of air exits the first air duct in a first direction;
 a second air duct configured to separately convey a second volumetric flow of air through the housing so that the second volumetric flow of air exits the second air duct in a second direction that intersects the first direction so that the volumetric flows of air collide after exiting the airducts; and
 a vane located along one of the air ducts, the vane being moveable to vertically change a perceived air discharge direction,
 wherein movement of the vane does not change the first or second direction in which each respective volumetric flow of air exits the respective air duct.

2. The air vent of claim 1, wherein the vane is not visible to a user of the air vent when the air vent is viewed from an air outlet end of the housing.

3. The air vent of claim 1, further comprising at least one additional vane located along each of the first and second air ducts, each additional vane being moveable to horizontally change the perceived air discharge direction.

4. An air vent as defined in claim 3, wherein each additional vane is not visible to a user of the air vent when the air vent is viewed from an air outlet end of the housing.

5. The air vent of claim 1, wherein the first and second air ducts are defined at least in part between an inner wall of the housing and respective first and second air guide surfaces, each air guide surface being in a fixed position with respect to the housing.

6. The air vent of claim 1, wherein the first and second directions are each defined at least in part by a shape of an inner wall of the housing and a shape of an air guide surface facing said inner wall and having a fixed position with respect to the housing.

7. The air vent of claim 1, wherein the vane is pivotably attached along one of the air ducts.

8. The air vent of claim 1, wherein the vane is a first vane located along the first air duct, the air vent further comprising a second vane located along the second air duct, the second vane being moveable to vertically change the perceived air discharge direction.

9. The air vent of claim 8, wherein the first and second vanes move together to vertically change the perceived air discharge direction.

10. The air vent of claim 1, wherein movement of the vane changes the first volumetric flow of air or the second volumetric flow of air.

11. The air vent of claim 1, further comprising a manipulator operatively coupled to the vane to move the vane to vertically change the perceived air discharge direction.

12. The air vent of claim 11, wherein the manipulator is operable to move at least one additional vane along one of the air ducts to horizontally change the perceived air discharge direction.

13. An air vent, comprising:
 air ducts configured to discharge two separate volumetric flows of air in respectively different and intersecting discharge directions; and
 a vane that is moveable to adjust a perceived air discharge direction with no change to the intersecting discharge directions,
 wherein the vane is not visible to a user of the air vent when the air vent is viewed from an air outlet end of the air vent.

14. The air vent of claim 13, wherein the perceived air discharge direction is vertically adjustable with no change to the intersecting discharge directions.

15. The air vent of claim 13, wherein the vane is a first vane that is moveable to change one of the two separate volumetric flows of air, the air vent further comprising a second vane that is moveable to change the other of the two separate volumetric flows of air to thereby adjust the perceived air discharge direction with no change to the intersecting discharge directions.

16. The air vent of claim 15, wherein the first and second vanes move together to change the two separate volumetric flows of air and to adjust the perceived air discharge direction with no change to the intersecting discharge directions.

17. The air vent of claim 15, wherein the first vane is located along a first one of the air ducts that conveys one of the volumetric flows of air through the air vent, and the second vane is located along a different second one of the air ducts that conveys the other of the volumetric flows of air through the air vent.

18. The air vent of claim 17, wherein the first air duct is partly defined by a first air guide surface that is parallel to one of the intersecting discharge directions at an air outlet opening of the air vent, and the second air duct is partly defined by a second air guide surface that is parallel to the other of the intersecting discharge directions at the air outlet opening of the air vent.

19. The air vent of claim 18, further comprising a housing through which the air ducts convey the respective volumetric flows of air, wherein each of the first air duct and the second air duct is partly defined by an inner wall of the housing, the inner wall being parallel with each of the first and second air guide surfaces.

\* \* \* \* \*